United States Patent [19]

Kitamura

[11] Patent Number: 5,028,826
[45] Date of Patent: Jul. 2, 1991

[54] FAN ARRANGEMENT FOR A VEHICULAR AC GENERATOR

[75] Inventor: Yutaka Kitamura, Itami, Japan

[73] Assignee: Mitsubishi Denki K.K., Tokyo, Japan

[21] Appl. No.: 531,274

[22] Filed: May 31, 1990

[30] Foreign Application Priority Data

Jun. 2, 1989 [JP] Japan .................. 1-65134[U]
Jun. 2, 1989 [JP] Japan .................. 1-141814

[51] Int. Cl.[5] .................. H20K 5/24; F04D 29/66
[52] U.S. Cl. .......................... 310/51; 310/62;
310/63; 310/60 R; 416/203; 416/223 B
[58] Field of Search .............. 310/68 D, 40 MM, 62,
310/63, 52, 58, 60 R, 51; 415/119; 416/178,
182, 187, 202, 203, 223 B, 232

[56] References Cited

U.S. PATENT DOCUMENTS

| | | | |
|---|---|---|---|
| 2,083,996 | 2/1935 | John | 416/203 |
| 3,006,603 | 10/1961 | Coruso | 415/119 |
| 4,253,800 | 3/1981 | Segawa et al. | 415/119 |
| 4,418,295 | 11/1983 | Shiga | 310/68 D |
| 4,488,070 | 12/1984 | Iwaki et al. | 310/68 D |
| 4,549,103 | 10/1985 | Shiga | 310/60 R |
| 4,930,984 | 6/1990 | Kesel et al. | 416/203 |

FOREIGN PATENT DOCUMENTS 1069279 7/1954 France .................. 416/203
0321303 10/1934 Italy .................. 415/119

Primary Examiner—Steven L. Stephan
Assistant Examiner—Thomas M. Dougherty
Attorney, Agent, or Firm—Sughrue, Mion, Zinn, Macpeak & Seas

[57] ABSTRACT

A vehicular AC generator comprising a magnetic pole core secured to a shaft and excited by an excitation coil, the magnetic pole core having opposite end faces, a stationary core surrounding the magnetic pole core and having mounted thereon a stationary coil, and a front and a rear bracket supporting the stationary core and rotatably supporting the shaft through bearings. The front and rear brackets having ventilation openings defined therein, and a fan mounted to each of the opposite end faces of the magnetic pole core is provided for generating flows of cooling air through the ventilation openings in the front and rear brackets, An inlet opening side end portion of a blade of the fan that overlaps the inlet opening has a radially length dimension which is equal to or less than 50% of radial length dimension of the inlet opening side end portion. The fan may be arranged to include a straight blade and a curved blade which are arranged at different angular intervals, and the inner end of all the blades may be positioned at the same distance from the center of rotation.

7 Claims, 7 Drawing Sheets

FIG. I

FAN ARRANGEMENT FOR A VEHICULAR AC GENERATOR

BACKGROUND OF THE INVENTION

This invention relates to a vehicular AC generator for use with a vehicular engine such as an automobile.

FIG. 1 illustrates a sectional view of a conventional vehicular AC generator, in which 1 indicates a front side bracket, 2 indicates a rear side bracket and 3 indicates a stator having a stationary core 3a and a stationary coil 3b wound thereon 1a and 2a indicate air inlet openings disposed in the end faces of the both brackets 1 and 2, 1b and 2b are air outlet openings disposed in an outer circumferential portion of brackets 1 and 2, and 20 indicates bolts for connecting open ends of the brackets 1 and 2 at the outer circumferential end portions of the stator core 3a to hold the core 3a therebetween. 6 indicates a shaft, which is rotatably supported by bearings 4 and 5 mounted to both the brackets 1 and 2 respectively. 7 and 8 indicate magnetic pole cores secured on the shaft 6 to position inside of the stator 3, 7a and 8a are pole pieces of the magnetic pole core, 9 indicates an excitation coil held between the inner circumferences of the magnetic pole cores 7 and 8, 30 and 40 indicate a pair of fans secured to the respective ends of the magnetic pole cores 7 and 8 for rotation with the shaft, 11 indicates a slip ring mounted to a the shaft 6, and 12 indicates a rotor composed of the shaft 6, the magnetic pole cores 7 and 8, the excitation coil 9, the fans 30 and 40 and the slip ring 11.

13 indicates an electric collector assembly having inside thereof a brush 13a contacting the slip ring 11, 14 indicates a rectifier which rectifies and converts an a.c. current, which is induced in the stator coil 3b when an excitation current is supplied to the excitation coil 9 from the brush 13a through the slip ring 11 and when the excitation coil 9 as well as the magnetic pole cores 7 and 8 are rotated by an unillustrated engine through a pulley 15, into a d.c. current, 14a indicates a heat sink for dissipating the heat generated in the rectifier 14, 16 indicates a voltage regulator for controlling the excitation current by detecting the generator voltage to regulate the terminal voltage, and 16a indicates a heat sink of the regulator 16. In the figures, $L_0$ indicates a radial length dimension of blades $30a \sim 30e$ of the fan 30, $L_1$ indicates a radial length dimension of the overlapping portions between the blades $30a \sim 30e$ and the inlet opening 1a. Also, FIG. 2 illustrates a side view of the AC generator showing the positional relationship between the inlet opening 1a of the front side bracket 1 and the fan 30.

FIG. 3 illustrates a front view of the fan 30, in which $30a \sim 30h$ are blades disposed at an equal angular interval $\theta°$, and in which the inner end of each of the blades is located at an equal distance from the center of rotation of the rotor 12.

FIG. 4 illustrates a front view of another fan 31 different from the above fan 30, in which $31a \sim 31e$ are blades disposed at uneven angular intervals $\theta_1 \sim \theta_5$ at every 180 degrees, and in which each blade $31a \sim 31e$ has a curved portion which is tilted in the circumferential direction opposite to the direction of rotation toward the outer diameter.

The operation of the conventional AC generator will now be described. The rotation of the fans 30 and 40 causes cooling air to flow through the inlet opening 1a of the front bracket 1 as shown by an arrow a, to cool the bearing 4, the magnetic pole core 7, the excitation coil 9, the stator core 3a and the stator coil 3b, with the cooling air being exhausted to the exterior through the outlet openings 1b. Similarly, the cooling air is also introduced from the inlet opening 2a in the rear bracket 2 as shown by an arrow b, cools the bearing 5, the voltage regulator 16, the rectifier 14, the magnetic pole core 8, the excitation coil 9, the stator core 3a and the stator coil 3b, and exhausted to the exterior through the outlet opening 2b.

Since the conventional vehicular AC generator is constructed as described above, the radial length dimension $L_1$ of the overlapping portion between the blades $30a \sim 30e$ of the fan 30 and the inlet opening 1a is equal to or more than about 80% of the radial length dimension L of the blades as illustrated in FIG. 1, so that the portion of the radial length dimension $L_1$ periodically and intermittently crosses the inlet opening 1a as the fan 30 rotates, resulting in a significant sound pressure of an annoying wind noise of a frequency of a rotational frequency multiplied by the number of the blades and a frequency of the number of the inlet openings 1a multiplied by an even number, i.e., the noise of 10th and 12th order frequencies in FIG. 2, leading to a main cause of an increased overall sound pressure level.

Also, when the number of the magnetic pole units 7a and the number of the blades of the fan 30 are equal as illustrated in FIG. 3 for example, the blades and the magnetic pole pieces mutually amplify when they rotate together, generating a wind noise of a frequency of a rotation frequency multiplied by the number of the blades and rotation frequency multiplied by the two-times the number of the blades, and thus, the wind noise of the frequencies of the 8th and the 16th harmonics becomes significant and annoying thus increasing overall sound pressure.

On the other hand, the fan 31 illustrated in FIG. 4 is the one improved from the fan 30, the main improvements being that the blades are disposed at uneven angular intervals at every 180 degrees, each blade has a curved configuration which is tilted in the circumferential direction opposite to the direction of rotation toward the outer diameter, and that the number of the blades and the number of the magnetic pole pieces are not equal to each other.

By applying the above improvements, with the fan 31 shown in FIG. 4, the overall level of the sound pressure level of the wind noise at various rotational speeds is generally decreased, but the ratio of the sound pressure of the frequencies of the 8th order and the 16th order to the overall level was not significantly changed. The reason for this is that two blades 31b of the fan 31 become small for the structural reason, so that it is not possible to match to the diameter of the inner ends of the other blades, whereby the effect of two blades 31b becomes small and has a substantially similar function as to that with eight blades. Thus, it has been very difficult to manufacture a fan in which the sound pressure level of the frequency of the orders of a multiple of the number of the magnetic pole pieces is decreased.

SUMMARY OF THE INVENTION

Accordingly, one object of the present invention is to provide a vehicular AC generator free from the above-discussed problems.

Another object of the present invention is to provide a vehicular AC generator in which an overall sound pressure level of the wind noise can be decreased.

Another object of the present invention is to provide a vehicular AC generator in which the sound pressure level of the frequency multiplied by the number of the fan blades and the frequency multiplied by the even number of the inlet openings can be decreased, thereby eliminating annoying noise characteristics.

Still another object of the present invention is to provide a fan arrangement for a vehicular AC generator in which the sound pressure level of the frequency of the order of the multiple of the number of the magnetic pole pieces therewithin is decreased.

With the above objects in view, the vehicular AC generator according to the present invention comprises a magnetic pole core secured to a shaft and excited by an excitation coil, a stationary core surrounding said magnetic pole core and having mounted thereon a stationary coil, a front and a rear bracket supporting said stationary core and supporting said shaft through bearings, a cooling air inlet opening disposed in respective axial end faces of said front and rear brackets, an exhaust air outlet opening disposed in respective circumferential surfaces of said front and rear brackets, and a pair of fans mounted to opposite end faces of said magnetic pole core for introducing flows of cooling air into the inside of said brackets through said inlet openings in said front and rear brackets, and is characterized in that the arrangement is such that an inlet opening side end portion of a blade of said fan that overlaps said inlet opening has a radial length dimension equal to or less than 50% of radial length dimension of said inlet opening side end portion.

With the above described arrangement, a significant reduction in sound pressure level of a frequency of a rotational frequency multiplied by the number of the blades and a frequency of the number of the inlet openings multiplied by an even number, i.e., the sound pressure level of the 10th and 12th order frequencies out of the frequencies of a wind noise can be advantageously reduced.

The fan arrangement of another aspect of the present invention is characterized in that the blade configuration includes a straight blade and a curved blade, that the blades are arranged at different circumferential intervals, and that the inner end of all the blades are disposed at the same distance from the center of rotation.

In this arrangement, the frequencies of wind noise generated by the rotation of the fan is dispersed, and the sound pressure level of various frequencies is supressed so that the overall level can be advantageously reduced.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 6:
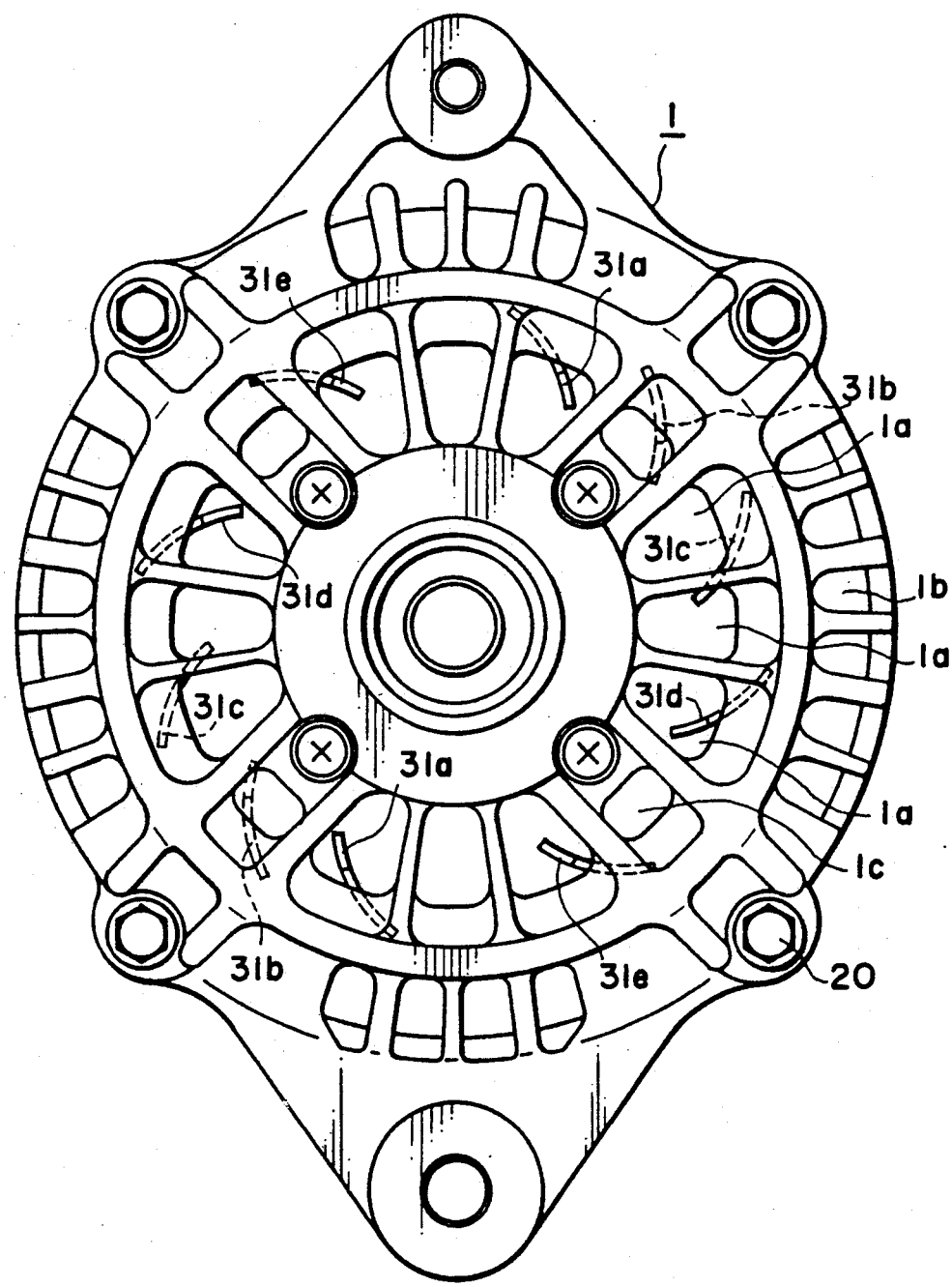
FIG. 6 is a front view illustrating the positional relationship of the bracket inlet openings and the fan.
Figure 5:
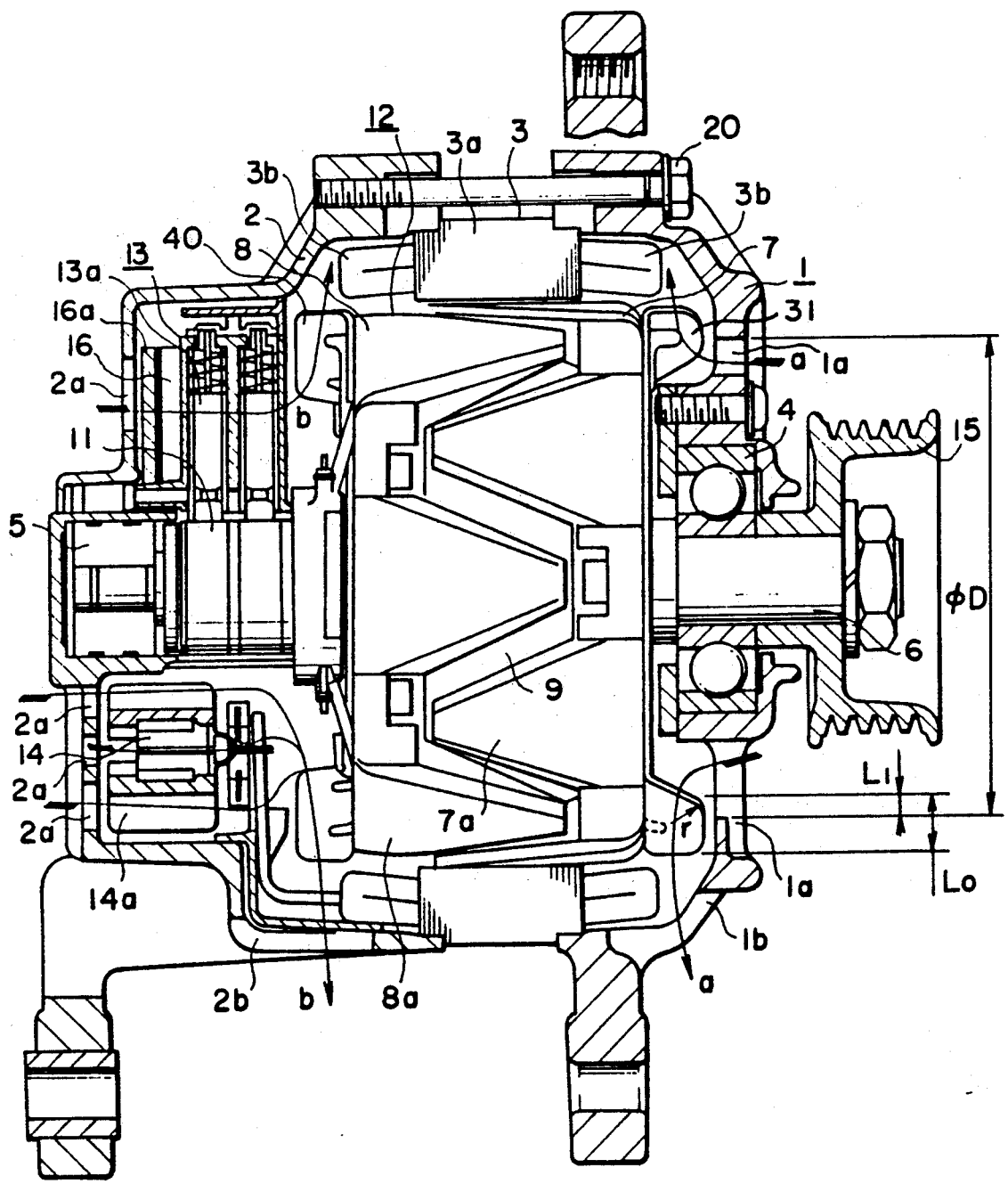
FIG. 5 is a sectional view of the vehicular AC generator of one embodiment of the present invention.

The present invention will now be described in conjunction with one embodiment of the present invention. FIG. 5 is a sectional view of the vehicular AC generator of the present invention, and FIG. 6 is a side view illustrating the relationship between the inlet openings of the front bracket and the fan. In FIGS. 5 and 6, 31 indicates a fan that can be used in place of he conventional fan 30, and $31a \sim 31e$ indicate blades of the fan 31. $L_0$ is a radial length dimension to the end portions on the side of the inlet opening 1a of the blades $31a \sim 31e$, $L_1$ is a radial length dimension of the blade end portions at which the blades $31a \sim 31e$ and the inlet opening 1a overlap and face to each other, and r is a radius of curvature of the radially inner corner of the inlet opening side end portions of the blades.

Figure 1:
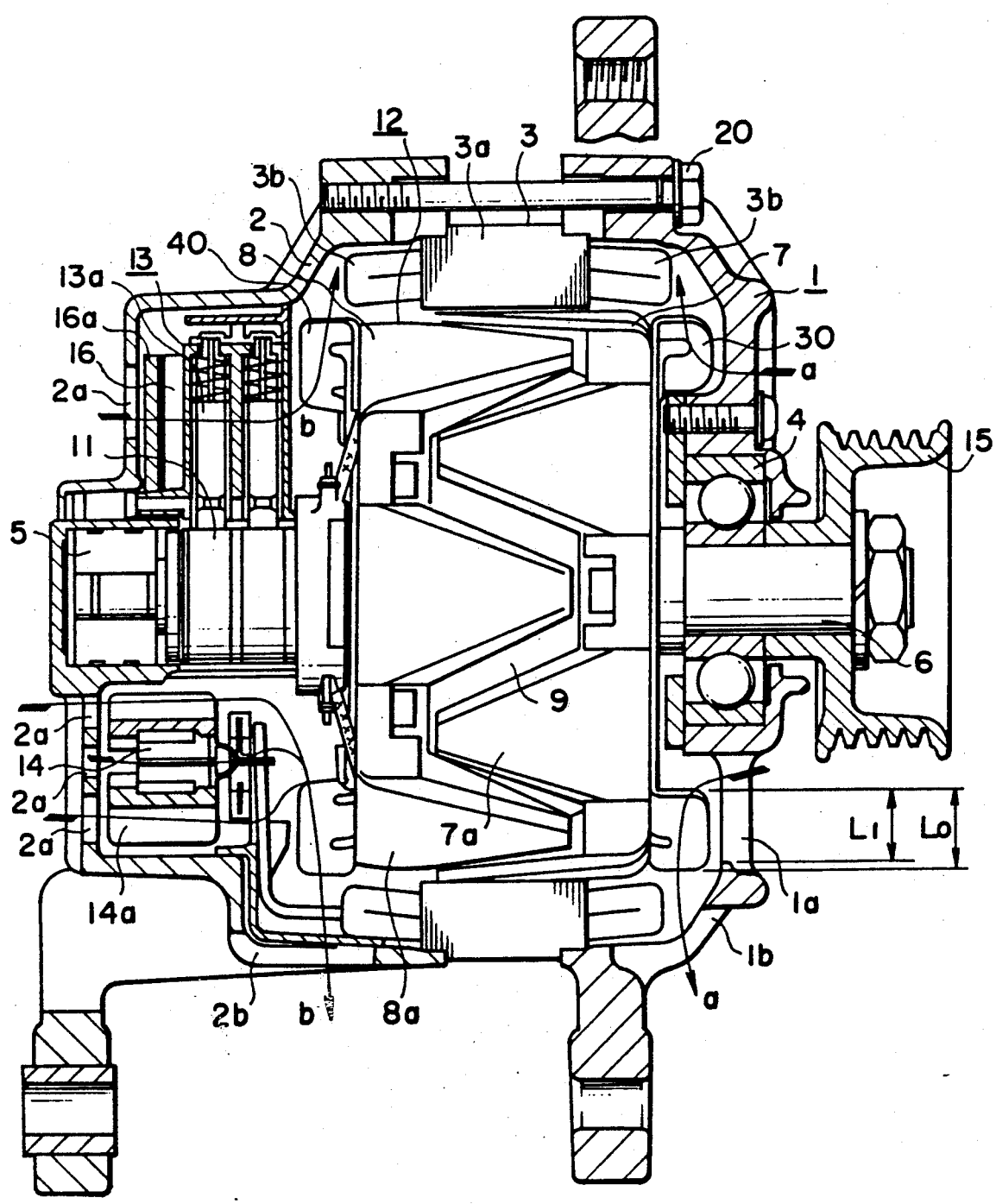
FIG. 1 is a sectional view of a conventional vehicular AC generator.
Figure 2:
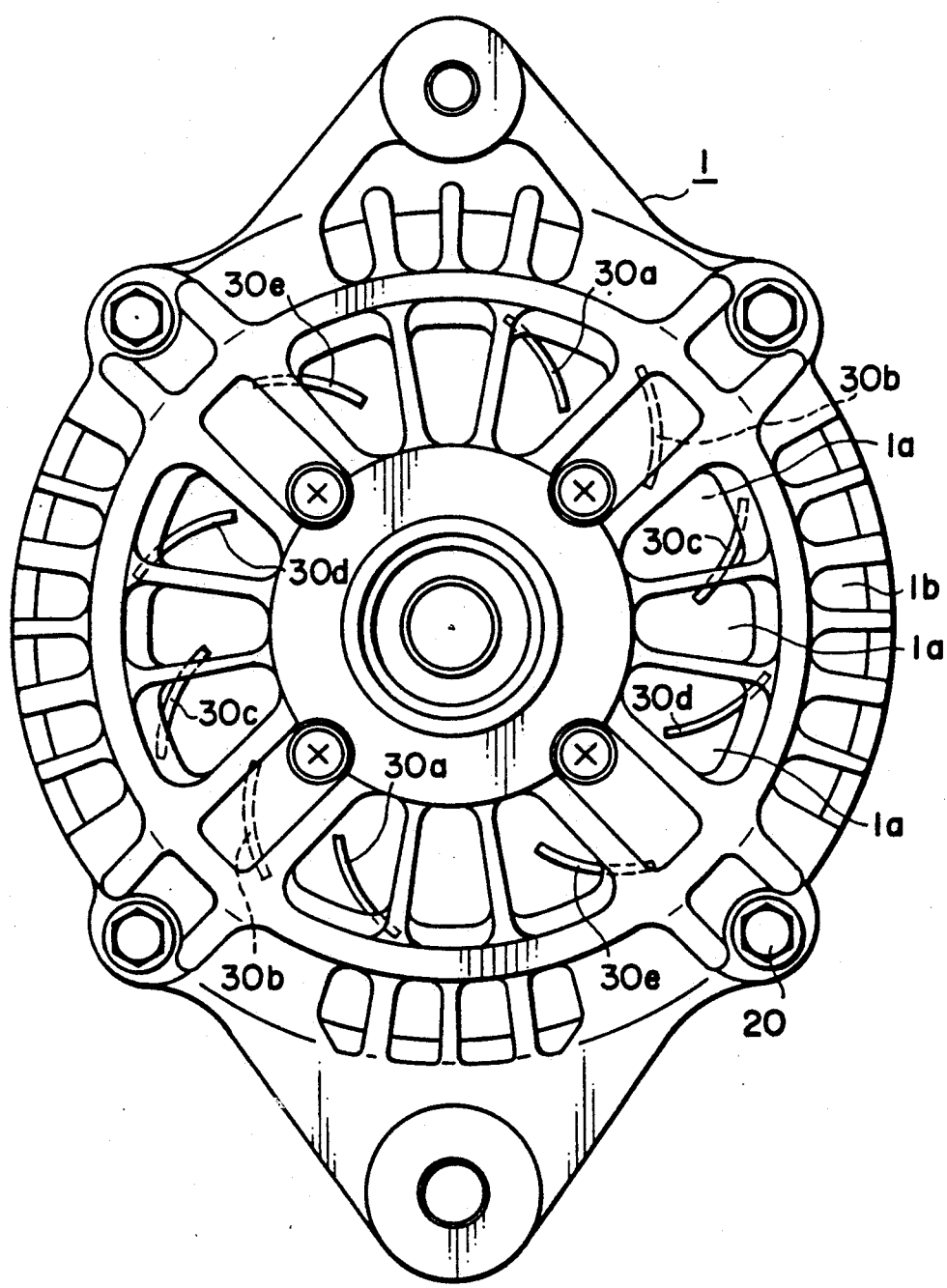
FIG. 2 is a side view showing the positional relationship of the conventional bracket inlet openings and the fan.

In order to make the above $L_1$ equal to or less than 50% of $L_0$, the outer diameter $\phi D$ of the above inlet opening 1a is made small, or the inner diameter of the end portions on the inlet opening side of the blades $31a \sim 31e$ is made larger than the inner diameter at the roots of the blades $31a \sim 31e$, and further, a radius r of a radius equal to or more than 30% of the radial length dimension $L_0$ is provided at the inner side corners of the inlet opening side end portions of the blades. Also, in order to complement the area of the inlet opening 1a, a second inlet opening 1c is defined in the bracket 1 as illustrated in FIG. 6. In FIGS. 5 and 6, other reference numerals are the same as those of the conventional example illustrated in FIGS. 1 and 2, so that the same reference numerals are assigned and their explanations are omitted.

As has been described, according to the present invention, the above $L_1$ is made equal to or less than 50% of $L_0$, so that a significant reduction in sound pressure level of a frequency of a rotational frequency multiplied by the number of the blades and a frequency of the number of the inlet openings multiplied by an even number, i.e., the sound pressure level of the 10th and 12th order frequencies out of the various frequencies of a wind noise can be advantageously reduced.

Also, since a radius r of a radius equal to or more than 30% of the radial length dimension $L_0$ is provided at the inner side corners of the inlet opening side end portions of the blades, the sound pressure level of the 10th and the 12th order frequencies can be further decreased.

As has been described, according to the present invention, the radial length dimension of the inlet opening side end portion of the blade of the fan that overlaps the inlet opening is equal to or less than 50% of the radial length dimension of the inlet opening side end portion, so that the overall sound pressure level of the wind noise can be decreased, thereby providing a low-noise vehicular generator with a suppressed annoying sound.

Figure 7:
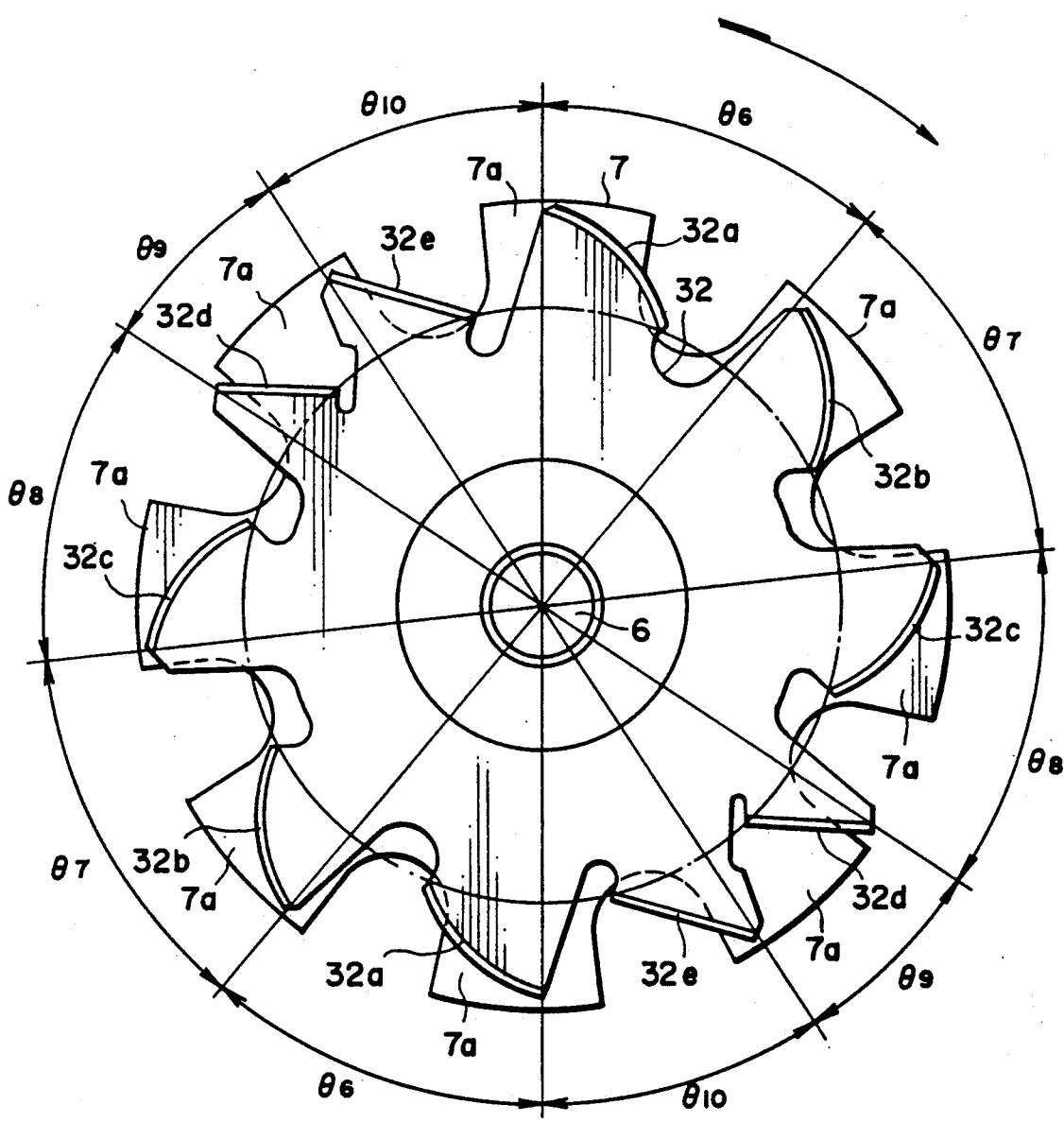
FIG. 7 is a front view of one embodiment of the fan of the dynamoelectric machine of the present invention.
Figure 4:
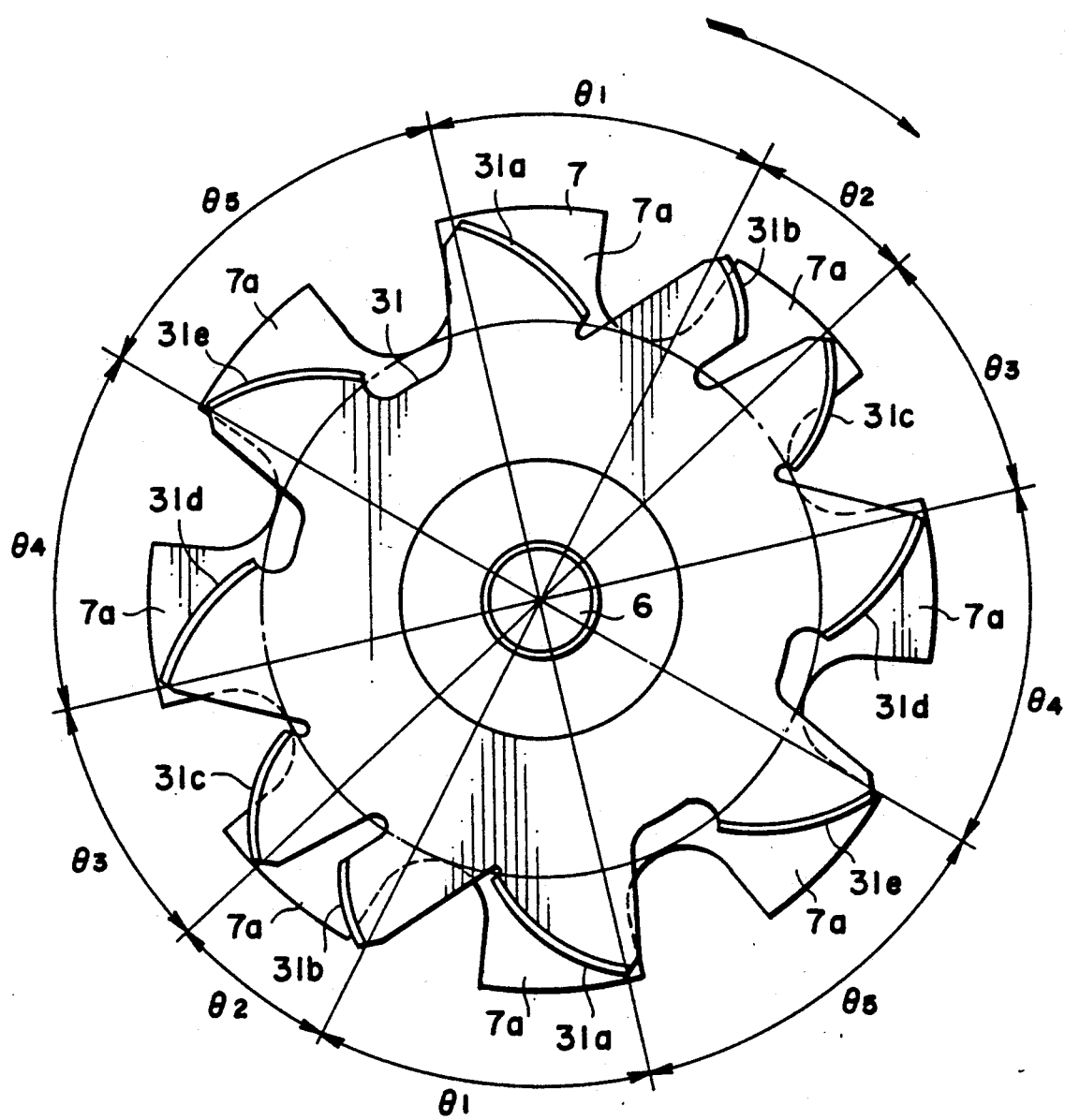
FIG. 4 is a front view of another conventional fan arrangement.
Figure 3:
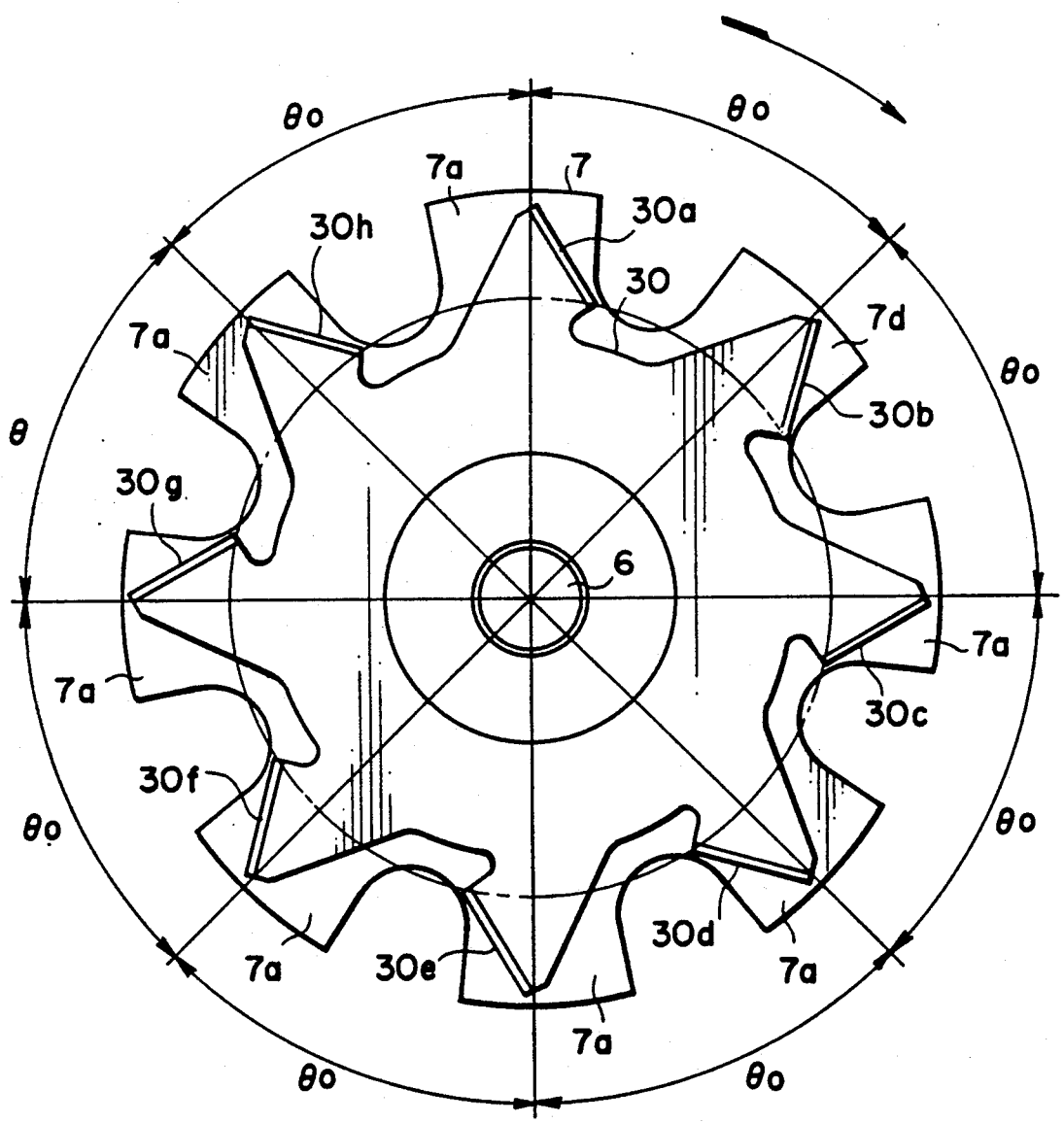
FIG. 3 is a front view of the conventional fan arrangement.

FIG. 7 is a front view of another fan arrangement of the dynamoelectric machine of the present invention, in which 32 indicates a fan in its entirety, and $32a \sim 32e$ indicate blades of the fan 32, the number of blades being ten as compared to the number of the magnetic pole pieces 7a of the magnetic pole core 7 being light. These blades 32a~32e are composed of four opposing blades 32d and 32e of the straight line configuration and six curved blades 32a, 32b and 32c curved to tilt in the direction opposite to the direction of rotation toward the radially outward direction. Also, these blades 32a~32e are arranged at different circumferential intervals within 180 degrees, and the inner end of all the blades are disposed at the same distance from the center of rotation.

According to the above arrangement, since the magnetic pole core 7 and the fan 32 rotate together, the frequency includes a frequency multiplied by the number of the magnetic pole pieces 7a, i.e., the 8th order frequency with respect to the rotation frequency, a sum of the numbers of the magnetic pole pieces 7a and the unillustrated magnetic pole pieces in pairs with the pole pieces 7a, i.e., the 16th order frequency, and a frequency multiplied by the number of the blades of the fan 32, i.e., the 10th order frequency, and also it is dispersed into the frequencies of the 12th order, the 20th order, the 24th order and the 48th order. Thus, the sound pressure of the frequency of the 8th order and the 16th order is dissipated into the 10th order, the 12th order, the 20th order and the like, so that the annoying wind noise is eliminated and the overall sound pressure level is decreased.

As has been described, according to the above embodiment, the blade configuration includes a straight blade and a curved blade, that the blades being arranged at different circumferential intervals, and the inner end of all blades being disposed at the same distance from the center of rotation, thus resulting in the overall sound pressure level of the wind noise being reduced and, providing a fan arrangement for a dynamoelectric machine which is less noisy and which suppresses annoying and unpleasant noise than conventional arrangement.

What is claimed is:

1. A vehicular AC generator comprising:
   a shaft;
   a magnetic pole core secured to said shaft and having opposite end faces;
   a stationary core surrounding said magnetic pole core and having mounted thereon a stationary coil;
   a front and a rear bracket supporting said stationary core and rotatably supporting said shaft through bearings, said front and rear brackets having ventilation openings defined therein;
   a fan mounted to each of said opposite end faces of said magnetic pole core for generating cooling air flows through said ventilation openings in said front and rear brackets, said fan comprising blades, and wherein an inlet opening side end portion of a blade of said fan that overlaps an inlet opening has a radial length dimension which is equal to or less than 50% of a radial length dimension of said inlet opening side end portion for decreasing noise resulting from said cooling air flows.

2. A vehicular AC generator according to claim 1, wherein an inner diameter of said inlet opening side end portions of said blades is made larger than an inner diameter at roots of the blades.

3. A vehicular AC generator according to claim 1, wherein a radius r is equal to or more than 30% of said radial length dimension being provided at inner side corners of said inlet opening side end portions of said blades.

4. A vehicular AC generator according to claim 1, said ventilation openings comprising two inlet openings in said front and rear bracket.

5. A vehicular AC generator according to claim 1, wherein said ventilation openings comprise a third inlet opening defined in said front bracket.

6. A fan for a dynamoelectric machine, said fan comprising a blade configuration which includes a straight blade and a curved blade, wherein the blades are arranged at different circumferential intervals, and wherein an inner end of said blades are disposed equidistantly from the center of rotation of said fan.

7. A fan arrangement according to claim 6, wherein said curved blades are curved to tilt in a direction opposite to a direction of said rotation of said fan toward a radially outward direction.

* * * * *